US 6,581,642 B1

(12) United States Patent
Ritchie et al.

(10) Patent No.: US 6,581,642 B1
(45) Date of Patent: Jun. 24, 2003

(54) PIPE TESTING APPARATUS

(75) Inventors: Sandy Ritchie, Buckie (GB); John Horn, Westhill (GB)

(73) Assignee: Hedley Purvis Limited, Northumberland (GB)

( * ) Notice: Subject to any disclaimer, the term of this patent is extended or adjusted under 35 U.S.C. 154(b) by 0 days.

(21) Appl. No.: 09/673,405

(22) PCT Filed: Apr. 14, 1999

(86) PCT No.: PCT/GB99/01139
§ 371 (c)(1),
(2), (4) Date: Dec. 28, 2000

(87) PCT Pub. No.: WO99/54699
PCT Pub. Date: Oct. 28, 1999

(30) Foreign Application Priority Data

Apr. 17, 1998 (GB) .............................................. 9808138

(51) Int. Cl.⁷ ................................................ F16L 55/10
(52) U.S. Cl. .......................................... 138/90; 138/89
(58) Field of Search ............................... 138/89, 90, 93, 138/91; 220/235–237

(56) References Cited

U.S. PATENT DOCUMENTS

| 3,693,408 A | * | 9/1972 | Hyde ...................... 138/90 X |
| 4,003,581 A | * | 1/1977 | Hutchinson ................. 138/177 |
| 4,149,566 A | * | 4/1979 | Stowe .......................... 138/90 |
| 4,658,860 A | * | 4/1987 | Reaux .......................... 138/89 |
| 4,817,671 A | * | 4/1989 | Mathison et al. ............. 138/89 |
| 5,797,431 A | * | 8/1998 | Adams .......................... 138/89 |
| 5,844,127 A |   | 12/1998 | Berube et al. ............ 138/89 X |

FOREIGN PATENT DOCUMENTS

| CA | 1312557 | 6/1988 |
| CA | 2196523 | 4/2001 |

* cited by examiner

Primary Examiner—Patrick Brinson
(74) Attorney, Agent, or Firm—Clifford W. Browning; Woodard, Emhardt, Moriarty, McNett & Henry LLP

(57) ABSTRACT

A pipe testing apparatus comprising an elongate tester body having sealing means and actuator means to deform said sealing means on activation. The apparatus is further provided with means to bias actuator means axially away from the sealing means on deactivation of said actuator means. The apparatus is typically used to test the integrity of pipelines at specific points, for example joints or welds.

8 Claims, 2 Drawing Sheets

PIPE TESTING APPARATUS

PIPE TESTING APPARATUS

Figure 1:
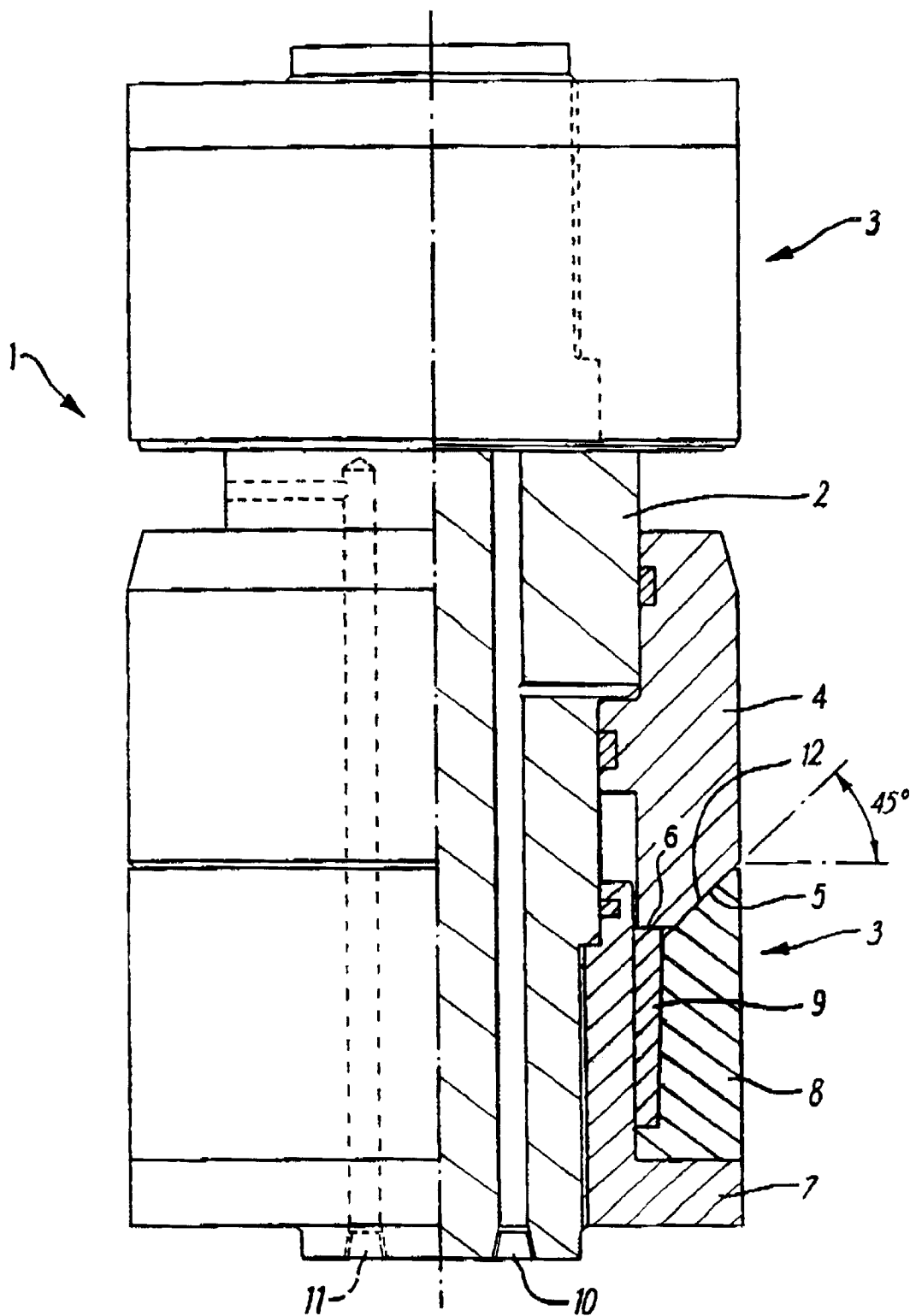

This invention relates to apparatus especially, but not exclusively for use in pipe testing and more particularly pressure testing of pipeline welds.

Pipelines to the type used to carry oil and gas often travel long distances and are subject to many potentially damaging effects both externally, from environmental effects, and internally, from substantial pressure effects. Clearly the nature of the transported material is such that leaks are not acceptable. There is thus a need to carry out testing of the integrity of the pipeline at certain points particularly joins or welded repair joints. This requires the use of appropriate pressure testing apparatus.

The pressure testing apparatus used is required to seal off the section of pipeline containing the join or weld to be tested so that pressure may be applied to that area.

The nature of the pipeline is such that any such pressure testing apparatus must be able to deal with two particular difficulties. These are the tendency of long lengths of pipeline to acquire a degree of ovality and the corrosive effect of the oil or gas on the internal surface of the pipeline which can become rough and pitted.

Previously proposed testing apparatus has attempted to overcome these difficulties by using resilient material seals which are forced into the gap between the exterior of a testing device and the interior surface of the pipeline to take up any ovality or surface imperfections.

A known problem of such an approach is that the seal in being forced into the gap between the body of the testing device and the pipeline, and additionally acted upon by the high pressure of the testing may become damaged. As a result the testing device requires frequent maintenance and repair.

A solution to this problem is proposed in GB2242530 where a sealing element is proposed which as outer and inner portions of varying degrees of resilience and deformability. The outer section is relatively soft, so as to deform to the contours of the pipeline, but the inner section is harder so that the overall deformability of the seal is limited. The seal is pushed against a cam slope by a thrust member acting axially so that the seal is deformed radially.

While this development goes some way to overcoming the previously identified difficulties it has limitations of its own. The limited deformability of the two part seal effectively places very narrow limits on the working diameter of the apparatus. The manner in which the seal is thrust against a cam surface to deform its surface against the pipe can lead to it becoming effectively stuck in position when the axial force of the thrust member is removed.

It is an object of the present invention to provide pressure testing apparatus which addresses these identified difficulties.

According to the present invention there is provided pipe testing apparatus comprising an elongate tester body having resiliently deformable pipe sealing means at an end portion thereof and actuator means arranged to resiliently deform said sealing means radially outwardly on activation thereof characterised in that an outwardly angled thrust face on said actuator engages a co-operating inwardly angled thrust face on said seal means in operation and further characterised in that further resilient means are provided to bias said actuator axially away from said seal means on deactivation of said actuator means.

Preferably said sealing means is composed of a nitrile rubber compound.

Most preferably said nitrile rubber compound has a shore hardness in the range of 60 to 90.

Preferably also said actuation means is a hydraulically operated piston assembly.

Preferably also the thrust faces on said actuator means and said seal means are arranged at 45° to the longitudinal axis thereof.

Preferably also the further resilient means is a rubber spring.

Alternatively the further resilient means may be a coil spring.

Preferably also said further resilient means acts between said actuator means and said seal means to bias them apart.

Preferably also a pair of said pipe sealing means are provided at either end of said tester body to form a pressure testing area.

Preferably means are provided for applying hydraulic pressure to said pressure testing area.

Figure 2:
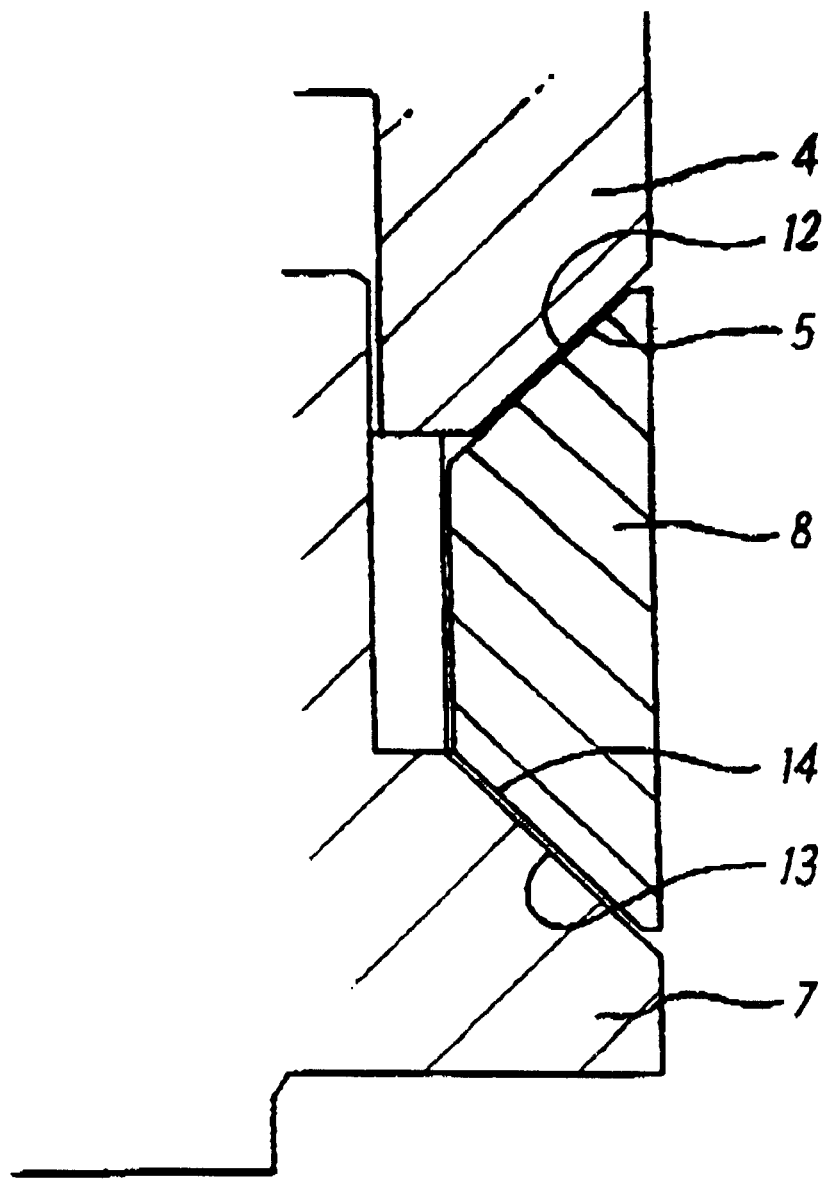

Embodiments of the present invention will now be described by way of example with reference to the accompanying drawings in which:

FIG. 1 is a part cut away side view of a first embodiment of pipe testing apparatus in accordance with the present invention; and FIG. 2 is a detail view of an alternative sealing member of a second embodiment of pipe testing apparatus in accordance with the present invention.

Referring to FIG. 1 of the drawings, pipe testing apparatus 1 comprises a tester body 2 which has sealing devices 3 positioned at opposing ends. Each sealing device 3 has a hydraulically operated actuator piston 4 which has a thrust surface 5 at one end set at an angle of 45° to the longitudinal axis of the apparatus. A secondary thrust surface 6 on the end of the piston is not angled. A seal carrier 7 is mounted on each end of the tester body 2 and forms a recess in which a seal 8 and spring 9 are mounted. Internal channels 10 and 11 provide a means for applying hydraulic pressure to the actuator pistons 4 and tester body 2 respectively.

The tester body 2 and seal carrier 7 are constructed from high tensile steel and the actuator pistons 4 from low carbon steel. The seal 8 is composed of a nitrile rubber compound having a typical shore hardness in the range 60 to 90. The spring 9 is composed of rubber.

In use the testing apparatus is inserted in a pipeline and positioned at the area to be tested. Hydraulic pressure applied through channel 10 acts on the piston 4 which are axially displaced so that the thrust surface 5 acts on a corresponding surface 12 on the seals 8 thus causing the seals to be displaced radially outwardly to engage the internal surface of the pipeline and form a pressure tight seal. At the same time the spring 9 is caused to be compressed by the secondary thrust surface 6 acting axially against it.

Pressure testing of the pipeline can then be carried out using the channel 11 which forms a test pressure port. The seals 8 are able to withstand pressure of several thousand psi.

The movement of the seal 8 is generally radially outward by the combined interaction with the thrust surface 5 and seal carrier 7. As a result the seal has less tendency to be squeezed into the small gap which may exist between the exterior of the piston 4 and seal carrier 7 and the interior of the pipeline which can result in damage to the seal.

When the pressure test is completed the hydraulic pressure on the pistons 4 is released with the result that the pistons 4 are encouraged back towards their original resting position by the compressed spring 9 which acts between the pistons 4 and the seals 8. The seals 8 are thus no longer constrained by the thrust surface 5 and have nothing acting upon them to retain them against the pipeline interior. The testing apparatus can thus be easily moved to a new testing area or if required removed from the pipeline.

Various modifications and improvements to the basic apparatus are envisaged. For example FIG. 2 shows an alternative seal arrangement. In this embodiment the seal carrier 7 has a surface 13 complimentary to the thrust surface 5 on the piston 4. The seal 8 also has a second angled end 14 complimentary to the first surface 12. In use the seal is effectively pushed outwardly by the closing of the gap between the thrust surfaces 5 and 13. Other aspects of the operation of the apparatus are generally as before.

Other modifications anticipated include the substitution of the rubber spring 9 with an alternative spring means such as a coil spring. The seals 8 may also be composed of other materials having similar physical characteristics to the nitrile rubber compound. The basic construction together with the suggested variations allow the apparatus to operate effectively over a range of diameters.

Further modifications and improvements may be incorporated without departing from the scope of the invention herein intended.

What is claimed is:

1. Pipe testing apparatus comprising an elongate tester body on a longitudinal axis having resiliently deformable pipe sealing means at an end portion thereof and actuator means arranged to deform said sealing means radially outwardly on activation thereof, characterised in that said sealing means has a first thrust face inwardly angled from the longitudinal axis and an oppositely arranged second thrust face perpendicular to the longitudinal axis, said actuator has a co-operating actuating thrust face outwardly angled from the longitudinal axis to engage the first thrust face on said sealing means in operation, said apparatus including a seal carrier having a carrier thrust face perpendicular to the longitudinal axis, wherein the carrier thrust face engages the second thrust face on said sealing means such that the sealing means resiliently deforms by the combined interaction of the actuator thrust face and the carrier thrust face on activation of the actuator means, the actuator means is a hydraulically operated piston assembly and further resilient means are provided to bias said actuator axially away from said sealing means on deactivation of said actuator means.

2. Pipe testing apparatus as claimed in claim 1 wherein said sealing means is composed of a nitrile rubber compound.

3. Pipe testing apparatus as claimed in claim 2 wherein said nitrile rubber compound has a shore hardness in the range of 60 to 90.

4. Pipe testing apparatus as claimed in claim 1 wherein the actuator thrust face on said actuator means and the first thrust face on said sealing means are arranged at 45° to the longitudinal axis thereof.

5. Pipe testing apparatus as claimed in claim 1 wherein the further resilient means is a rubber spring.

6. Pipe testing apparatus as claimed in claim 1 wherein said further resilient means acts between said actuator means and said seal means to bias them apart.

7. Pipe testing apparatus as claimed in claim 1 wherein a pair of said pipe sealing means are provided at either end of said tester body to form a pressure testing area.

8. Pipe testing apparatus as claimed in claim 1 wherein means are provided for applying hydraulic pressure to said pressure testing area.

* * * * *